United States Patent
Hoenke

(10) Patent No.: US 8,082,822 B2
(45) Date of Patent: Dec. 27, 2011

(54) VEHICLE TOE SET ADJUSTMENT DEVICE AND METHOD

(75) Inventor: Mark S Hoenke, Grand Rapids, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 299 days.

(21) Appl. No.: 12/251,778

(22) Filed: Oct. 15, 2008

(65) Prior Publication Data

US 2009/0100972 A1    Apr. 23, 2009

Related U.S. Application Data

(60) Provisional application No. 60/980,502, filed on Oct. 17, 2007.

(51) Int. Cl.
*B25B 23/00* (2006.01)
*B25B 13/48* (2006.01)
(52) U.S. Cl. .................. 81/57.14; 81/57.22; 81/57.24
(58) Field of Classification Search .............. 081/57.14, 081/57.22, 57.36, 57.2, 57.4, 57.13, 57.24
See application file for complete search history.

(56) References Cited

U.S. PATENT DOCUMENTS

| | | |
|---|---|---|
| 1,469,589 A | 10/1923 | Palmer |
| 1,478,736 A | 12/1923 | Gadberry |
| 3,535,960 A | 10/1970 | Borries |
| 4,376,396 A | 3/1983 | Hayhoe |
| 4,443,951 A | 4/1984 | Elsasser et al. |
| 4,674,366 A | 6/1987 | Lauer et al. |
| 4,679,327 A | 7/1987 | Fouchey et al. |
| 4,868,472 A | 9/1989 | Daggett |
| 5,027,275 A * | 6/1991 | Sakamoto et al. .............. 701/36 |
| 5,040,303 A | 8/1991 | Koerner |
| 5,048,379 A | 9/1991 | Gramera et al. |
| 6,308,593 B1 | 10/2001 | Shibayama et al. |
| 7,357,053 B2 * | 4/2008 | Doan .......................... 81/57.14 |
| 2006/0108131 A1 | 5/2006 | Osada et al. |

FOREIGN PATENT DOCUMENTS

| | | |
|---|---|---|
| JP | 2000289640 A | 10/2000 |
| JP | 2004017907 A | 1/2004 |
| JP | 2004351604 A | 12/2004 |

OTHER PUBLICATIONS

Vehicle toe set adjustment device mountable to six-axis robot and sold more than one year prior to Oct. 17, 2007.

(Continued)

*Primary Examiner* — Hadi Shakeri
(74) *Attorney, Agent, or Firm* — Gardner, Linn, Burkhart & Flory, LLP

(57) ABSTRACT

A vehicle toe set adjustment device and method for adjusting a vehicle tie rod includes an adjustment head adapted to be received over a tie rod. The adjustment head includes a surface for engaging a tie rod fastener, a plurality of moveable collet keys mounted on the adjustment head, and a drive member engaging surface. An actuator on the adjustment head moves the collet keys to engage the tie rod after the tie rod is received in the adjustment head. A method is also provided for engaging moveable collet keys on an adjustment head to engage the tie rod for rotation of the tie rod to adjust the toe set of a vehicle wheel. The device and method are useful with a variety of tie rod assemblies on various vehicles having different sized tie rod assemblies.

15 Claims, 17 Drawing Sheets

OTHER PUBLICATIONS

Vehicle toe set adjustment device sold more than one year prior to Oct. 17, 2007.

Images of drive assembly of toe set adjustment devices of Cites A and B.

Wiesen, Stefan "Increased Quality through Static Wheel Alignment and Automatic Toe Setting"; SAE Technical Paper 850220 Feb. 1985.

International search report of corresponding PCT application No. PCT/US2008/079988. Jun. 8, 2009.

Written Opinion of the ISA of corresponding PCT application No. PCT/US2008/079988. Nov. 2009.

\* cited by examiner

VEHICLE TOE SET ADJUSTMENT DEVICE AND METHOD

CROSS REFERENCE TO RELATED APPLICATION

The present application claims priority of U.S. provisional application, Ser. No. 60/980,502 filed Oct. 17, 2008, by Hoenke for VEHICLE TOE SET ADJUSTMENT DEVICE AND METHOD, which is hereby incorporated herein by reference in its entirety.

FIELD OF THE INVENTION

The present invention is directed to a vehicle toe set adjustment device and method for engaging and rotating the tie rod of a vehicle tie rod assembly for setting the vehicle toe alignment on a wheel of the vehicle.

BACKGROUND OF THE INVENTION

Previously known toe set devices for vehicles have typically been adapted for use with a single type of tie rod assembly. One such device has been guided mechanically into engagement with the tie rod and shifted laterally along the tie rod to engage one side of a double sided socket to engage and loosen a tie rod fastening jam nut when the tie rod device is rotated and then shifted laterally in the opposite direction to engage flat surfaces formed on the tie rod to rotate and adjust the tie rod position. The device is then shifted laterally back to the jam nut followed by retightening of that jam nut to hold the tie rod in the adjusted position.

However, the tie rod assemblies on modern vehicles are not all formed similarly, some having much more confined space on the tie rod for adjusting the tie rod position. Further, various tie rod assemblies include larger diameter flanges or rings adjacent the adjusting flats and/or tie rod fastening jam nut which prevent or make it difficult to shift the tie rod adjustment device laterally into engagement with one or the other of these features. Therefore, automatic engagement of a tie rod adjusting device with the various tie rod assemblies on modern vehicles has become increasingly difficult thereby making proper adjustment of the toe set on such vehicles more difficult.

A need has arisen, therefore, for a tie rod adjustment device and method that can accommodate varying types of tie rod assemblies having differing sizes of tie rod adjustment areas and tie rod fasteners with various spacing therebetween, especially on an automated basis.

SUMMARY OF THE INVENTION

Accordingly, the present invention provides a vehicle toe set adjustment device for adjusting a vehicle tie rod, the toe set adjustment device adapted to fit varying types and sizes of tie rods which are used on different vehicle types.

In one form, the vehicle toe set adjustment device includes a tie rod engaging assembly having an adjustment head adapted to engage a tie rod and a tie rod fastener on the tie rod as well as a drive assembly connected to the adjustment head to rotate the adjustment head and the tie rod fastener or tie rod as desired. The tie rod engaging assembly is mounted on a positioning device, the positioning device being operable in response to a control to engage the adjustment head with a tie rod of the vehicle. The adjustment head includes extendable gripping members to engage and grip the tie rod to enable rotation of the tie rod when the adjustment head is engaged with the tie rod by the positioning device.

Preferably, the positioning device is a multi-axis robot having a robot arm to which the tie rod engaging assembly is mounted. When positioned adjacent a vehicle, such as beneath the vehicle on a test assembly, a control directs the positioning robot to find and engage the tie rod assembly of the vehicle at a-predetermined position, move the tie rod engaging assembly into engagement with the tie rod fastener or jam nut, loosen or release the fastener and engage the gripping members with flats or other surfaces on the tie rod assembly to allow rotation of the tie rod and adjustment of the toe set position of the vehicle. After adjustment, the tie rod fastener or jam nut is refastened to hold the tie rod assembly in its adjusted position.

Preferably, the gripping members include a plurality of collet keys while the adjustment head further includes an actuator ring movably mounted to the adjustment head to extend and withdraw the collet keys into and out of engagement with the tie rod. A second drive assembly such as a pneumatically operated actuator plate assembly is operated to move the actuator ring to extend and withdraw the collet keys via a camming action.

In another form, the invention is a vehicle tie rod adjustment device for adjusting a vehicle tie rod, the adjustment device comprising an adjustment head having interior and exterior surfaces, an opening from the exterior surface to the interior surface and through which a tie rod is adapted to be received, a surface for engaging a tie rod fastener, a plurality of collet keys movably mounted on the adjustment head, and a drive member engaging surface. Also included is an actuator that engages the adjustment head and moves the collet keys to engage the tie rod when the tie rod is received in the adjustment head. The actuator is movably received on the adjustment head for engagement with the collet keys. Thus, the adjustment head is engagable with the tie rod fastener and the tie rod for rotation and adjustment thereof.

In preferred forms of the invention, the actuator assembly extends and withdraws the collet keys to engage and grip the tie rod when rotation of the tie rod is desired. Preferably, the actuator is an actuator ring or collet that is axially shifted to cam the collet keys simultaneously into or out of engagement with the tie rod. The actuator ring or collet includes a circumferential groove with a pneumatically operated fork assembly having a shift bearing engaging the groove to laterally shift the ring.

In other aspects, the adjustment head is adapted for engagement with a drive member for engaging the drive member engaging surface to rotate the adjustment head when rotation of the tie rod fastener or tie rod is desired. Preferably, the drive member engaging surface on the adjustment head is a gear ring while the adjustment head drive member includes a drive gear assembly engaging the gear ring. It is also preferred that the tie rod fastener engaging surfaces include a socket laterally offset from the collet keys and adapted to be engaged with a fastener such as a jam nut on the tie rod for securing the tie rod in a desired position.

The invention also includes a method for adjusting a vehicle tie rod. The method includes providing an adjustment head for engagement with the vehicle tie rod, the adjustment head including a plurality of tie rod engagement keys movably mounted thereon, and engaging the adjustment head with the tie rod, moving the keys into engagement with the tie rod, and rotating the adjustment head and tie rod while the keys are engaged with the tie rod to adjust the position of the tie rod on the vehicle.

In a preferred form of the method, the adjustment head is engaged with a threaded tie rod fastener and rotated while engaged with the tie rod fastener to loosen the fastener prior to moving the keys into engagement with the tie rod.

The present invention allows engagement of the adjustment head with a tie rod at a neutral position and movement axially along the tie rod one way or the other before engaging the gripping members or collet keys with the tie rod for adjustment. This enables the adjustment head to be moved laterally over enlarged areas of the tie rod such that the vehicle toe set adjustment device is useful on a variety of tie rod assemblies. However, even when the size of the tie rod varies, the extendable gripping members can be used to grip various sized tie rods to enable adjustment without having to make wholesale or radical changes in the adjustment device on the positioning robot.

These and other objects, advantages, purposes and features of the invention will become more apparent from a study of the following description taken in conjunction with the drawings.

DESCRIPTION OF THE PREFERRED EMBODIMENTS

Figure 1:
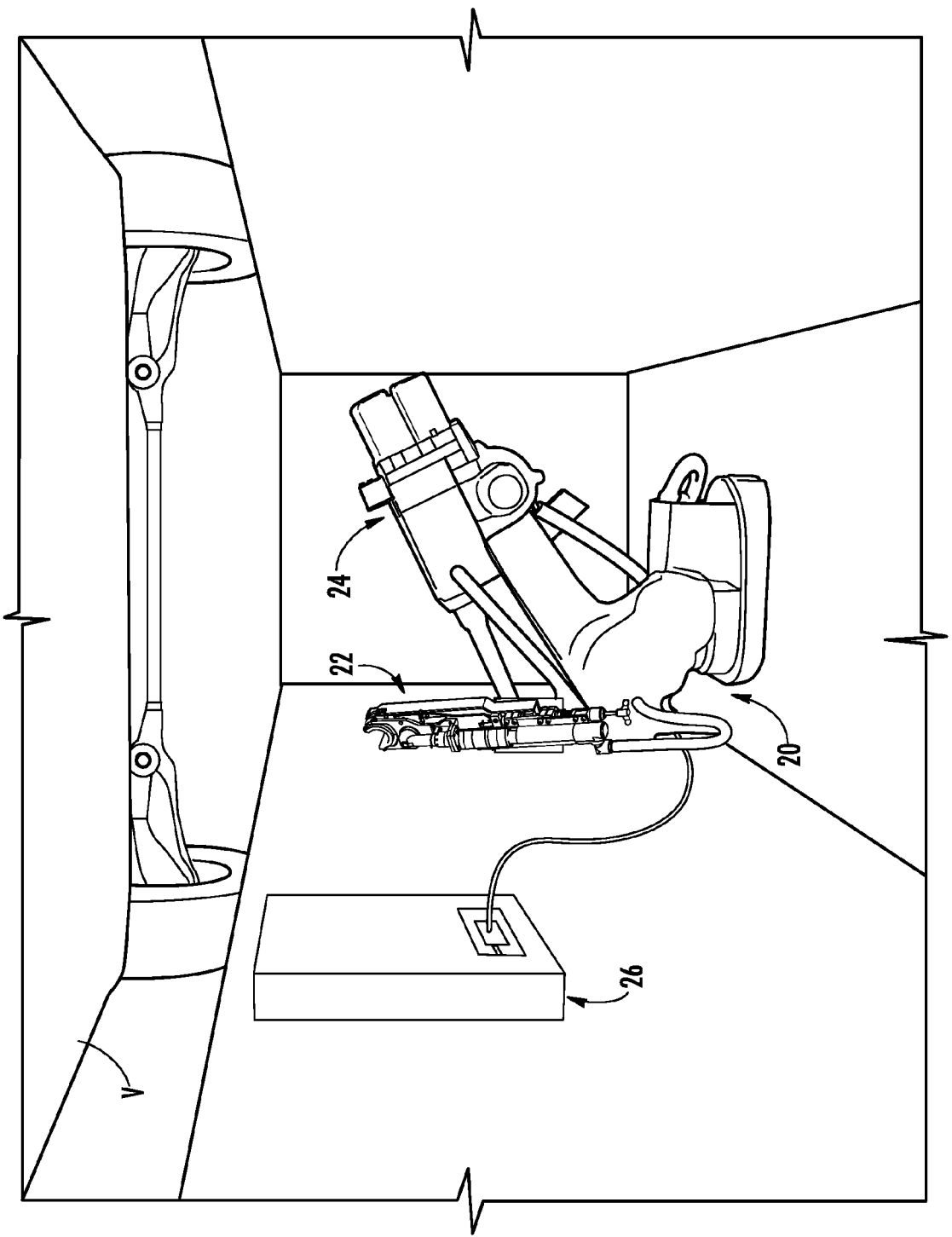
FIG. 1 is a perspective view of a vehicle toe set adjustment device including a multi-axis robot support positioned beneath a vehicle on a test stand assembly.
Figure 2:
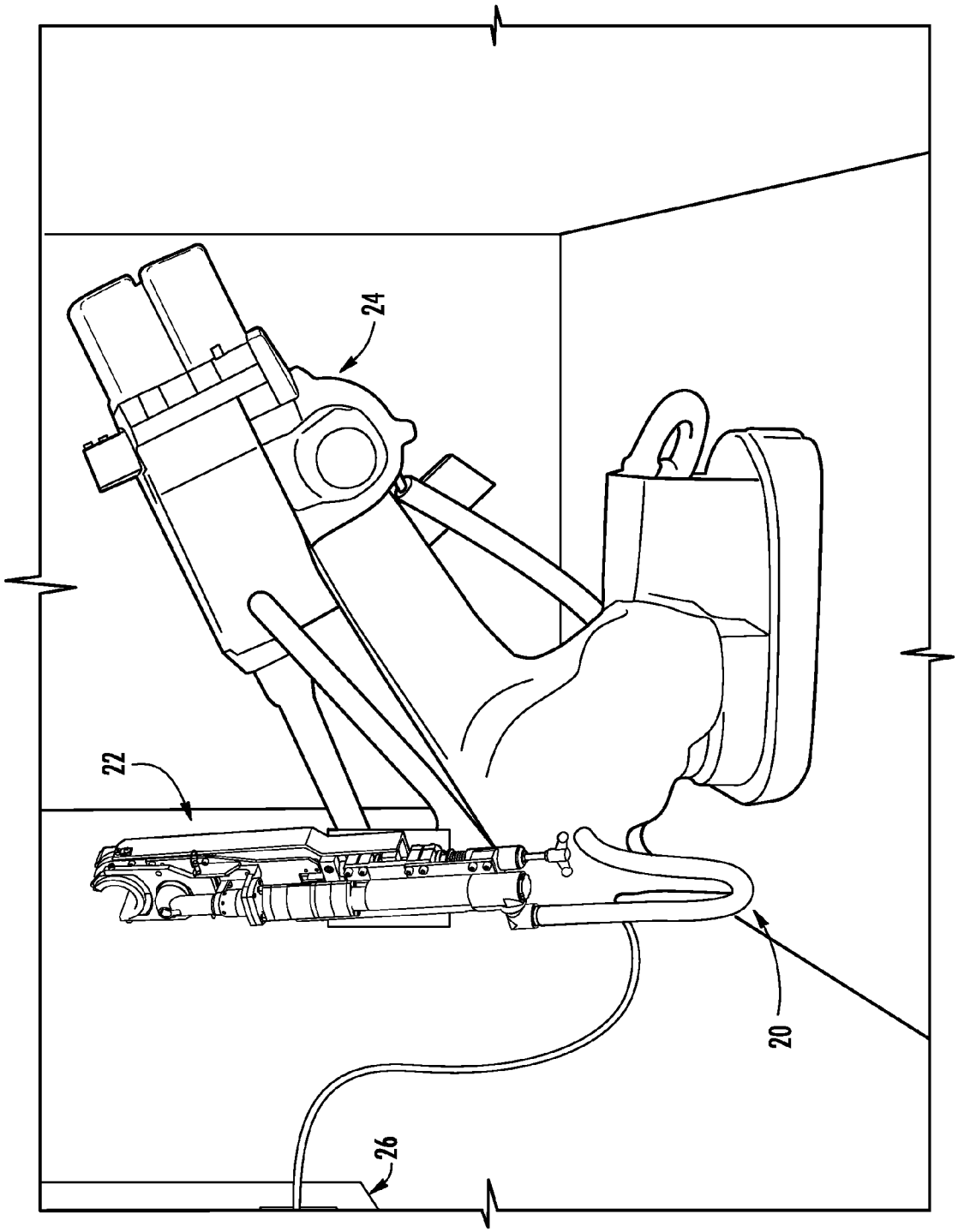
FIG. 2 is an enlarged perspective view of the vehicle toe set adjustment device of FIG. 1.

Referring now to the drawings in greater detail, FIGS. 1 and 2 illustrate a vehicle toe set adjustment device or tie rod adjustment device 20. Adjustment device 20 is operable to selectively engage a tie rod, loosen a fastening member or portion of the tie rod such that the tie rod may be rotated, rotate the tie rod, and retighten the fastening member, to thereby set the toe adjustment for one of the steerable wheels of a vehicle.

In the illustrated embodiment, tie rod adjustment device 20 includes a tie rod engaging assembly 22 mounted to a robot, such as a multi-axis robot 24. The vehicle toe set adjustment device 20 may also incorporate a control 26 as well as a wheel alignment measurement device (not shown). Control 26 may incorporate or be connected with a computer such as a portable computer, programmable logic device, or the like for automated control of robot 24 and the tie rod engaging assembly 22. The wheel alignment measurement device, which may be a wheel alignment device such as that disclosed in U.S. patent application Ser. No. 11/768,444, filed Jun. 26, 2007, entitled APPARATUS AND METHOD FOR DETERMINING THE ORIENTATION OF AN OBJECT SUCH AS VEHICLE WHEEL ALIGNMENT, or application Ser. No. 12/113,300, filed May 1, 2008, entitled NON CONTACT WHEEL ALIGNMENT SENSOR, both of which are assigned to Burke E. Porter Machinery Company of Grand Rapids, Mich., and are incorporated by reference herein, is operable to measure the toe alignment of a wheel, with control 26 being operable to monitor the measured alignment and operate tie rod engaging assembly 22 and robot 24 to engage the vehicle tie rod and selectively adjust the tie rod while measuring the wheel toe alignment to properly set the wheel toe alignment to desired tolerances.

Toe set adjustment device 20 may also incorporate a camera (not shown) or include locating coordinates preset in control 26 for the particular type of vehicle being measured such that robot 24 can position the tie rod engaging assembly 22 for engagement with the tie rod assembly of the vehicle. Typically, as shown in FIG. 1, multi-axis robot 24 is positioned adjacent or beneath the vehicle V when the vehicle V is supported on a test support along or adjacent to the vehicle assembly line in a vehicle manufacturing assembly plant or on a test support in a vehicle service center. When a camera is included, the camera may be part of a non-contact wheel alignment device and operate to determine the tie rod position by calculating the wheel center point based on images of the rotating wheel. The coordinates of the wheel center point, which allows the position of the tie rod assembly on the vehicle to be determined therefrom, are then communicated to control 26 for use by the robot 24. Alternately, a camera may be positioned beneath the vehicle and operable to directly image and calculate the location of the tie rod for coordinating engagement of the tie rod by the tie rod engaging assembly 22 via control 26.

Figure 3:
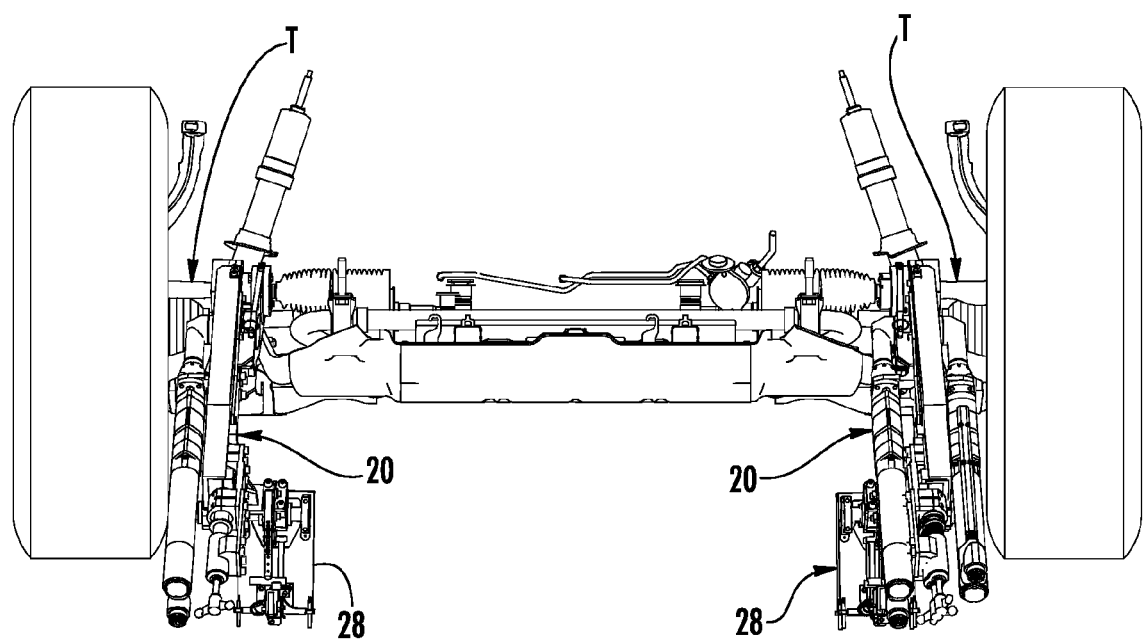
FIG. 3 is a perspective view of a pair of the vehicle toe set adjustment devices of the present invention engaging the left and right tie rod assemblies of a vehicle.
Figure 4:
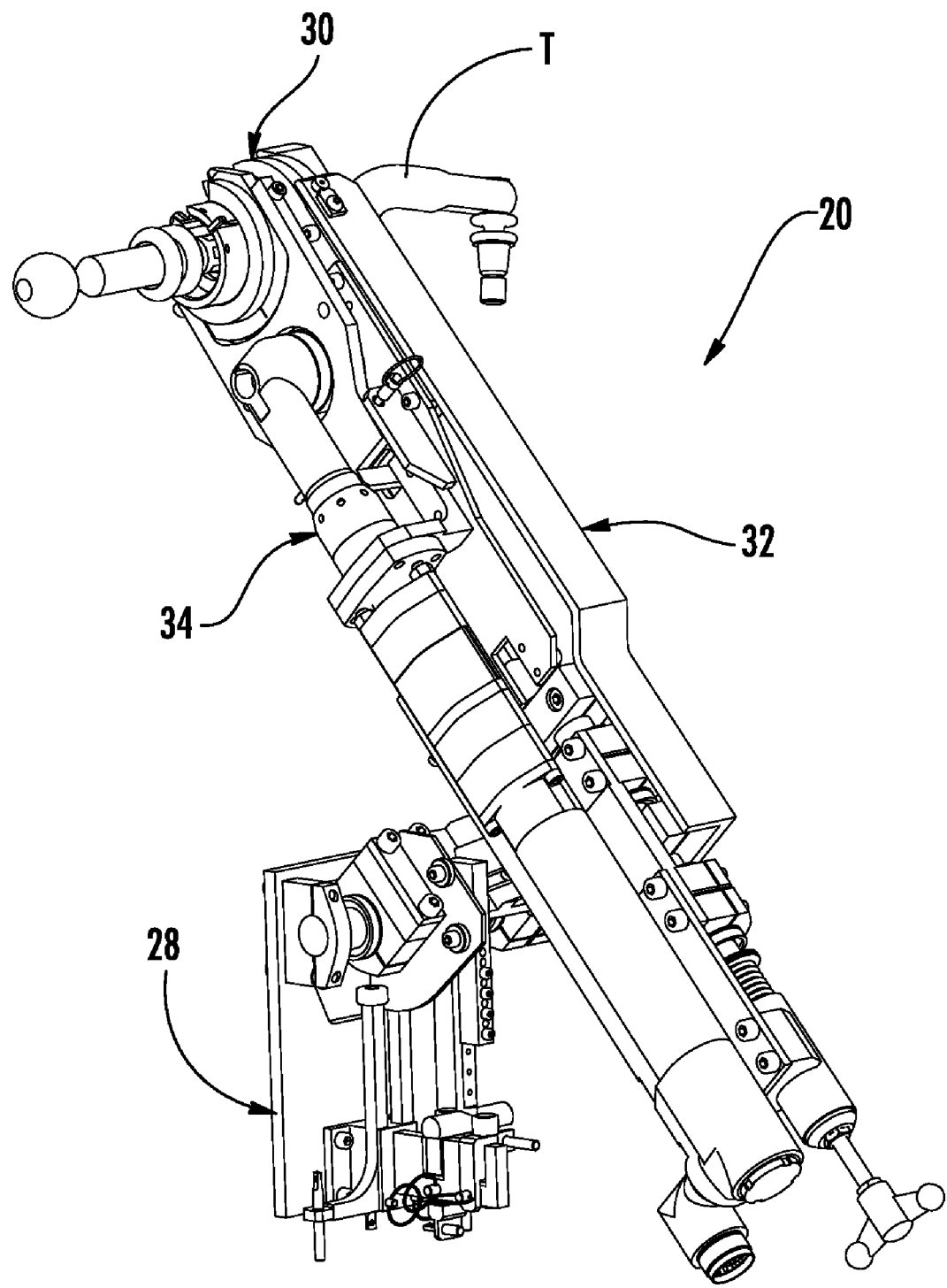
FIG. 4 is a left perspective view of one of the vehicle tie rod adjustment devices engaged with a tie rod assembly as shown in FIG. 3.
Figure 5:
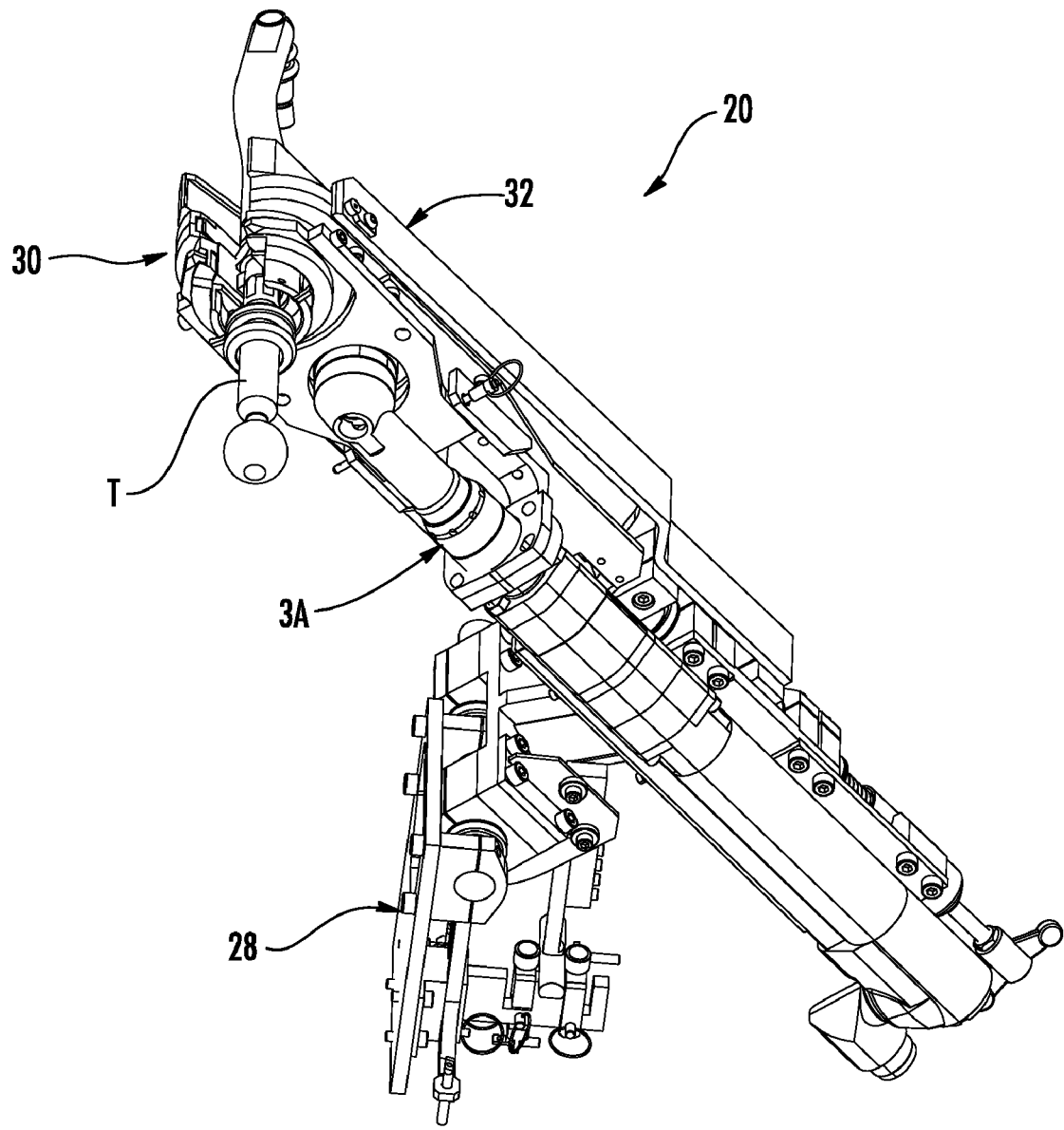
FIG. 5 is a front perspective of the vehicle toe set adjustment device of FIG. 4 engaging the tie rod assembly of a vehicle.
Figure 6:
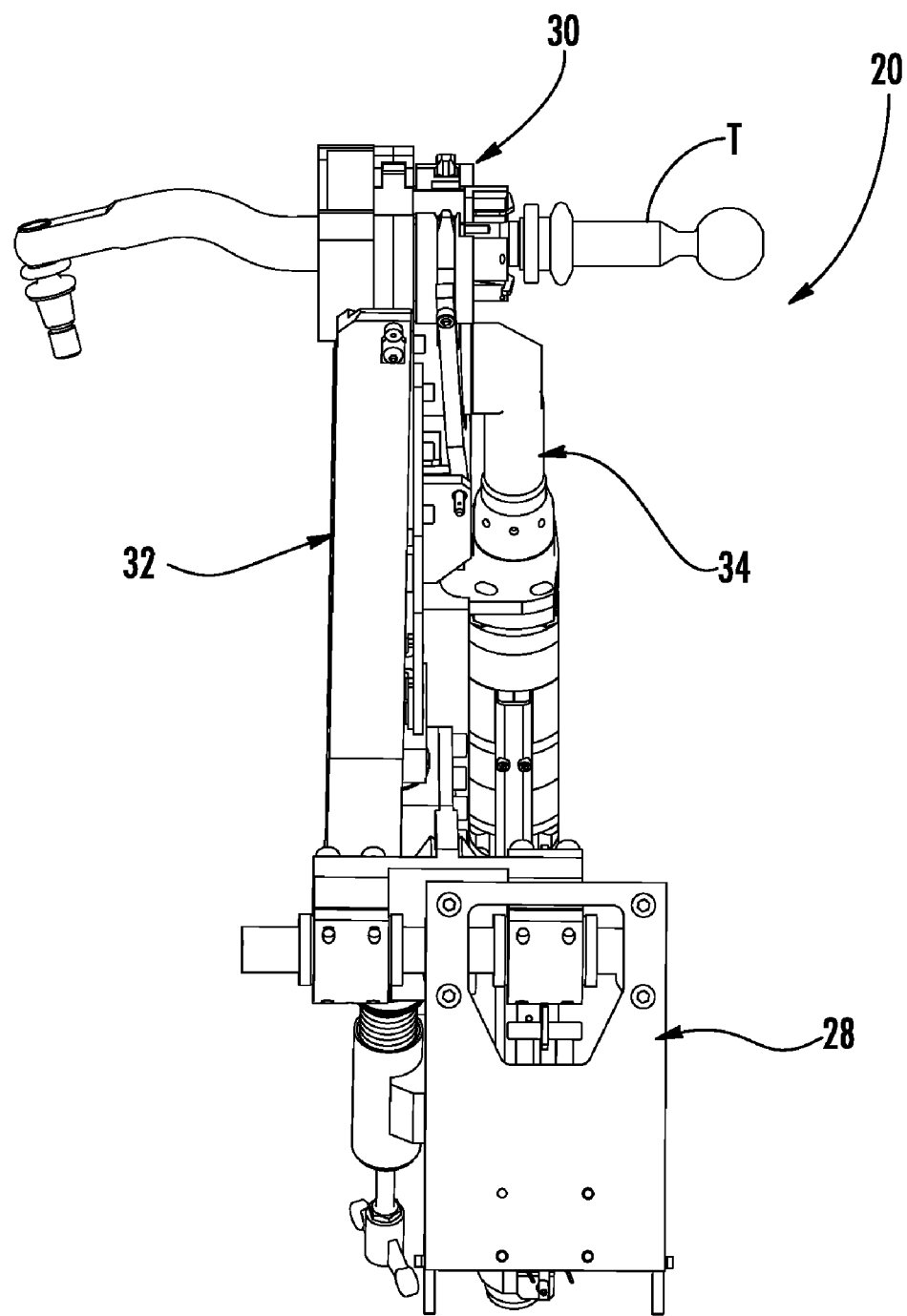
FIG. 6 is a front elevation of the vehicle toe set adjustment device of FIGS. 3 and 4 engaging the tie rod assembly of a vehicle.
Figure 7:
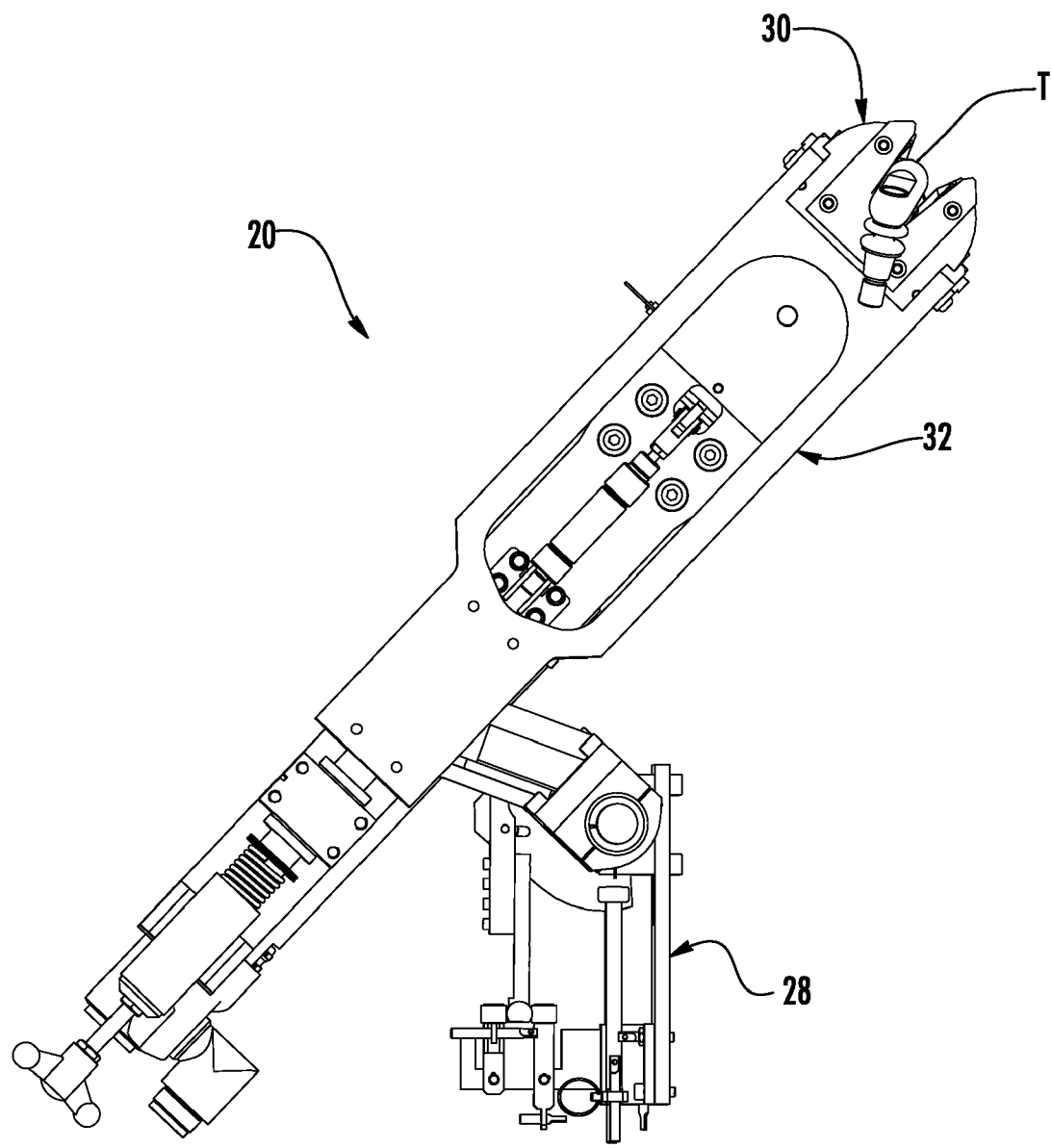
FIG. 7 is a right side elevation of the vehicle toe set adjustment device of FIGS. 4-6 engaging the tie rod assembly of a vehicle.

As shown in FIG. 3, a pair of tie rod engaging assemblies 20 are shown engaged with the left and right tie rods T of a vehicle. Each tie rod engaging assembly 20 includes a robot mounting or robot compliance assembly 28 (FIGS. 4-7) adapted to be secured to the support arm of a robot assembly such as that at 24. Robot compliance assembly 28 provides soft compliance of the tie rod engaging assembly 20 with the tie rod assembly of the vehicle when the robot positions the assembly 20 adjacent to the tie rod and urges the tie rod engaging assembly into engagement with the tie rod prior to tie rod adjustment. Compliance assembly 28 is a standard/conventional assembly providing multiple axes of movement to enable the assembly 20 to adjust to the position of the tie rod when moved by robot 24. These axes typically include tilt, lateral, left, right, axial and rotational.

Figure 19:
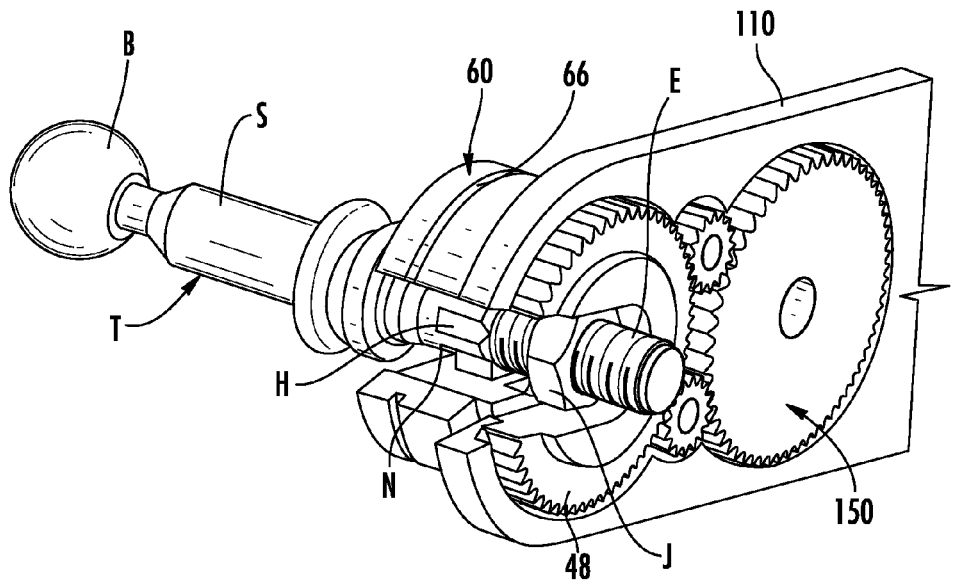
FIG. 19 is fragmentary perspective view of the adjustment head engaging a tie rod jamb nut and tie rod of a vehicle tie rod assembly during adjustment.
Figure 20:
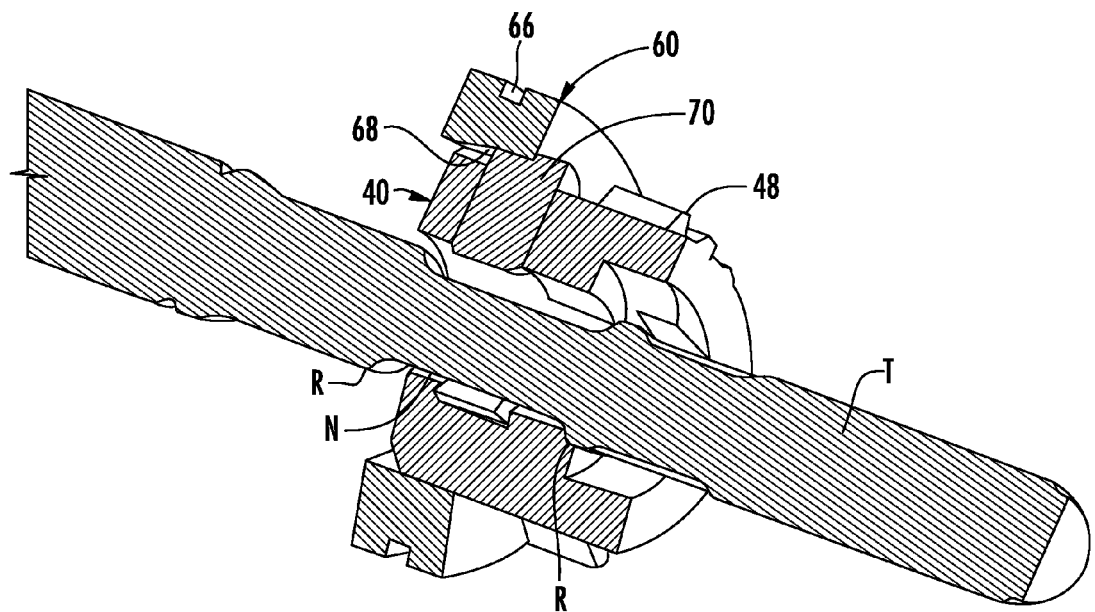
FIG. 20 is a sectional perspective view of a portion of the adjustment head engaging a tie rod prior to adjustment.

As is best seen in FIGS. 19 and 20, tie rod T typically includes a rigid, cylindrical shaft S having a ball joint B at one end for universal connection to a steering output rack and pinion assembly and a threaded end E adapted for rotatably adjustable connection to the vehicle axle assembly such as the outer tie rod ball joint rod end. A tie rod jamb fastener or nut J is threaded on rod end E and tightened against a portion of the wheel/axle assembly such as the tie rod ball joint rod end to hold tie rod T in its adjusted position. A series of flats H is formed in a hex pattern around shaft S of rod T adjacent threaded end E for engagement with a suitable tool to allow rotation and thus axial adjustment of rod T to change the toe position of the associated wheel assembly. Flats H are typically formed in the neutral zone N of tie rod T intermediate various annular ridges or larger diameter areas R integrally formed on shaft S. Neutral zone N provides an area for receipt of an adjustment tool such as adjustment head 30. As described below, lateral or axial movement of a tool along tie rod T to align with flats H or with jamb nut J as it rotates may require the tool to pass over at least some of ridges R during its movement. Adjustment bead 30 can be moved axially along the rod T to engage jamb nut J or to be aligned with flats H and over ridges R because of the interior clearance within tubular socket 40 prior to engagement of collets keys 70 with the tie rod as is explained more fully below.

As shown in FIGS. 4-7, tie rod engaging assembly 20 includes an adjustment assembly or head 30 partially covered by an elongated housing 32, and a drive assembly 34 for rotating the adjustment head when engaged with tie rod T. Preferably, drive assembly 34 is a right angle drive assembly such as is available, for example, from Stanley Assembly Technologies of Cleveland, Ohio.

As is best seen in FIGS. 8-12 and 16-20, adjustment head 30 includes a C gear or tubular socket or tube 40 rotatably received in C-shaped opening 112 of mounting plate 110 (FIG. 9) on a suitable bearing. Tube socket 40 has a generally cylindrical exterior surface 42, a central axial opening 43, a configured interior surface 44 and a radially extending opening -46 extending from the interior to the exterior adjacent end 45 of the tube. Adjacent the opposite end 47 of tube 40, is a C shaped ring gear 48 formed integrally with tube 40 and having a radial opening 50 aligned with radial opening 46. A pair of opposed, rectangular collet key receiving apertures 52 is formed along a diameter of tube 40, which diameter extends generally perpendicular to the radial extension of openings 46, 50. Immediately adjacent collet key receiving apertures 52 is an interior circumferential wall 56. On the side of wall 56 opposite apertures 52 are angled surfaces forming a wrench or hex socket 58 adapted to receive a hex nut such as jamb nut J on the rod T for rotation. Hex socket 58 is immediately adjacent an annular surface 59 within tube 40 (FIGS. 12 and 16B) that is aligned with C shaped ring gear 48 and opens to end 47 of tube 40. An elongated recess or slot 49 (FIG. 14) is formed in surface 42 generally midway between apertures 52 and extends axially therealong. Slot 49 receives a pin to connect an annular actuator ring 60 to tube 40 for rotation with tube 40 while allowing axial shifting of the actuator ring along surface 42 for movement of collet keys 70 as explained more fully below.

Telescoped over end 45 of tube 40 is annular actuator ring 60 best seen in FIGS. 8-15. Actuator ring 60 is generally C-shaped, has a width less than tube 40 and includes a radial opening 62 (FIGS. 9 and 10) leading to a central axial opening 64 receiving the cylindrical surface 42 of tube 40. On its exterior, actuator ring 60 includes an annular groove 66 adapted to receive a shift bearing 130 (FIGS. 8, 11 and 15) adapted to shift actuator ring 60 axially or laterally along surface 42 of tube 40 to engage, extend and disengage collet keys 70 with tie rod T when desired. Actuator ring 60 also includes an angled cam surface 68 (FIGS. 12 and 20) tapering outwardly from opening 64 toward the side of ring 60 facing the collet keys as described below. Actuator ring 60 is keyed to tube 40 for rotation therewith but axial sliding movement therealong by a roll pin 67 (FIGS. 8 and 14) extending radially through one portion of the ring into axially extending slot 49 (FIG. 14) in the circumferential surface 42 of tube 40. Slot 49 has a length less than the length of surface 42 such that pin 67 and ring 60 can slide axially along surface 42 for the length of the slot while the engagement of pin 67 with the sides of slot 49 causes the ring to rotate with tube 40. Pin 67 acts as a stop when it reaches one end or the other end of the slot thereby preventing further axial movement of the ring after shifting by shift bearing 130. Axial movement of ring 60 can also be limited by adjustable screws (not shown) to limit movement of the movable piston of cylinder 140 or of actuating arm 136.

Figure 12:
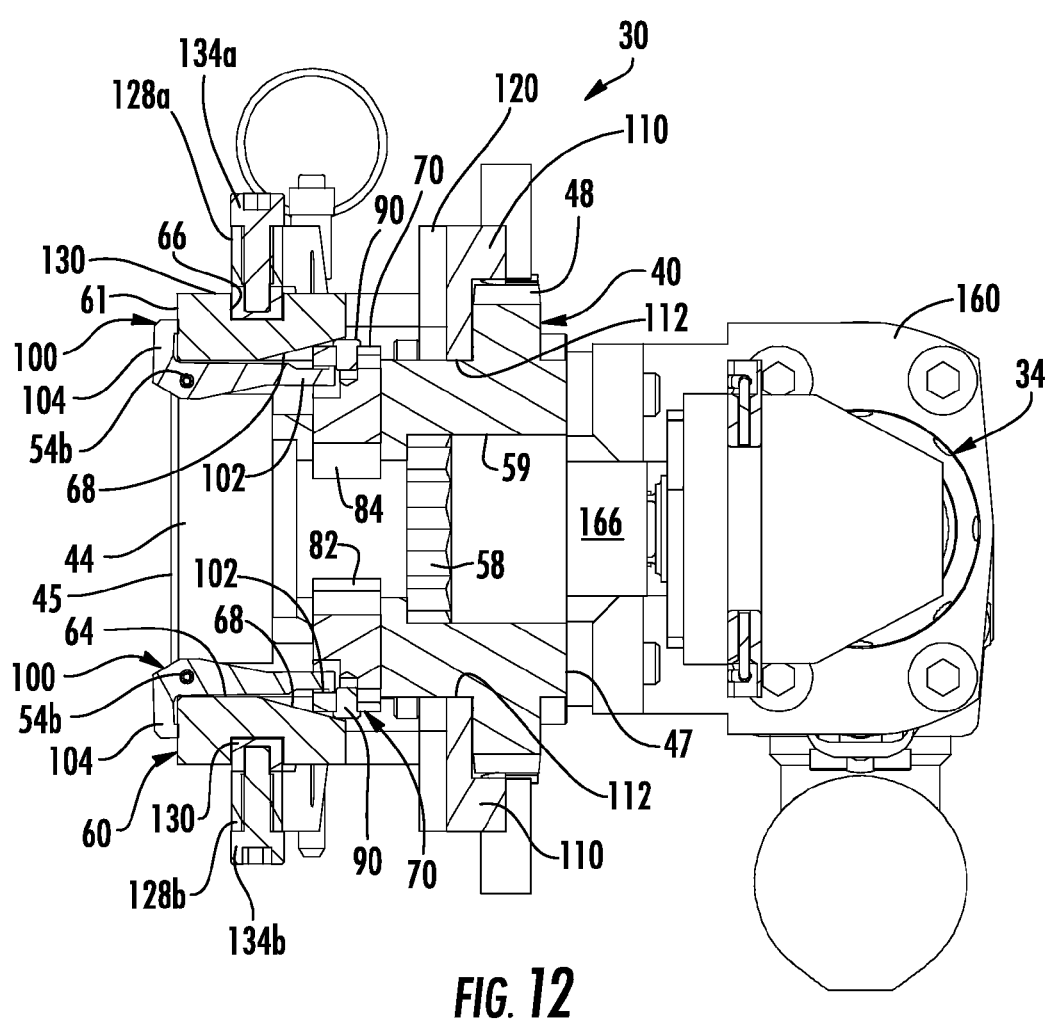
FIG. 12 is sectional end elevation of the vehicle toe set adjustment device taken along plane XI-XI of FIG. 8.

Received in each of the apertures 52 in tube 40 is a rectangular collet key 70 having a top surface 72, side surfaces 74, 76, end surfaces 78, 80 and angled bottom surfaces 82, 84 (FIGS. 18A-18D). Surfaces 82, 84 extend at an angle to one another of approximately 120 degrees and are adapted to be received over an intermediate corner and an adjacent pair of flats H on tie rod T for engagement therewith when rotation of the tie rod is desired. Although surfaces 82, 84 are preferably adapted to engage hex surfaces or flats H such as those on a conventional hex nut, it will be understood that surfaces 82, 84 could also be shaped to match other tie rod engaging surfaces as necessary. As shown in FIG. 12, collet keys 70 are inserted in apertures 52 with angled surfaces 82, 84 projecting radially inwardly toward axial opening 43. Each collet key 70 includes an aperture 86 in top surface 72 adapted to receive a replaceable stud or wear pin 90 (FIG. 12) adapted for engagement with cam surface 68 on actuator ring 60 when ring 60 is shifted laterally to extend collet key 70 into axial opening 43 for engagement with tie rod T. Replaceable studs or wear pins 90 each include a carbide surface for wear resistance and may be secured within apertures 86 by means of set screws, adhesives or by press fitting. Further, each collet key 70 includes an aperture 88 in side surface 74 for receiving the extending end 102 of an L-shaped lifter arm or lifter 100 adapted for retraction of collet key 70 when engaged by actuator ring 60 as described below.

Figures 17A, 17B:
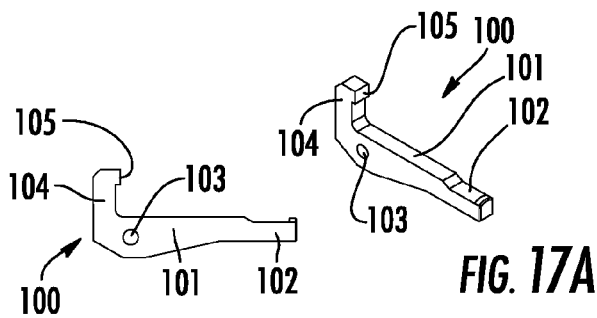
FIGS. 17A-17B are perspective and elevation views of a lifter arm for use with the collet keys of the adjustment head of the present invention.
Figure 18D:
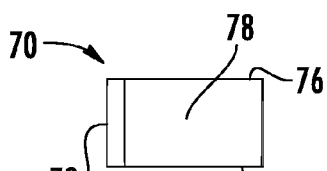
Figure 18B:
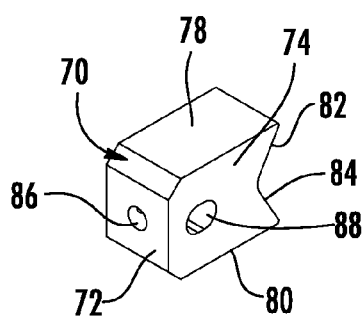
Figure 18C:
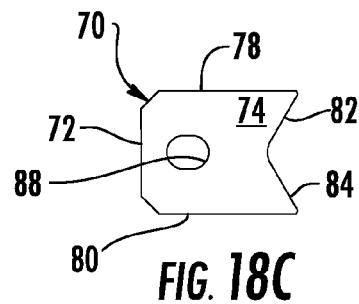

As is best seen in FIGS. 17A-17B, lifter arm 100 has a generally L-shape and includes a body 101 having an extending end 102 adapted to be received in aperture 88 of one of collet keys 70 and an upstanding arm 104 at the end opposite from end 102. Arm 104 extends at an angle to main body 101, and preferably a right angle, and has engaging surface 105 adapted to engage side 61 (FIG. 12) of actuator ring 60 as ring 60 is shifted away from collet keys 70. Lifter arms 100 are received in slots 54 of tube 40 and are each secured by a press fit spring pin 54b (FIG. 12) extending through aperture 103 in body 101 and in aligned apertures 54a (FIGS. 16A, 16B and 16E) which extend through cylindrical surface 42 and slot 54. When pinned in slot 54 in this manner (FIG. 12), lateral shifting of actuator ring 60 toward end 45 of tube 40 engages surface 105 on arm 104 to pivot end 102 outwardly around pin 54b. Because end 102 is inserted in aperture 88 of the collet key, outward movement of end 102 lifts collet key 70 and moves it radially outwardly away from tie rod T when disengagement is desired.

As will be best understood from FIGS. 8, 9, 11, and 12, tube 40 is mounted for rotation in mounting plate 110 which extends generally parallel to drive assembly 34. Mounting plate 110 includes a C-shaped aperture 112 through which end 45 of tubular socket 40 is received prior to insertion of collet keys 70, lifters 100 and actuator ring 60 thereover. A radial opening 113 extends from the end of plate 110 to aperture 112. Extending rearwardly away from adjustment head 30 and secured on the side of mounting plate 110 opposite gear ring 48 is an actuator mounting plate 120. Securing plates 122 extend outwardly at spaced positions adjacent the upper and lower edges of plate 120 for pivotal mounting of a forked actuator plate 124 therebetween by means of a pin 126 such as a quick release pin. The forward end of actuator pivot plate 124 includes spaced, parallel arms 128a between which is received a C-shaped shift bearing 130 having a radial opening 132 aligned with opening 113 of mounting plate 110 such that tie rod T may be received therethrough when adjustment head 30 is engaged with the tie rod assembly. The forked end of actuator plate 124 is pivotally secured to shift bearing 130 by means of a pair of pivot pins 134a, 134b aligned along a common axis on a diameter of the circular aperture in shift bearing 130 and a diameter of tube 40 when received therethrough. Preferably, shift bearing 130 is formed from a self-lubricating material such as a high-strength, engineering polymer including a self-lubricating material. One example is a filled nylon composition sold as a Nylatron™ plastic available from Polymer Corporation of Reading, Pa.

Figure 8:
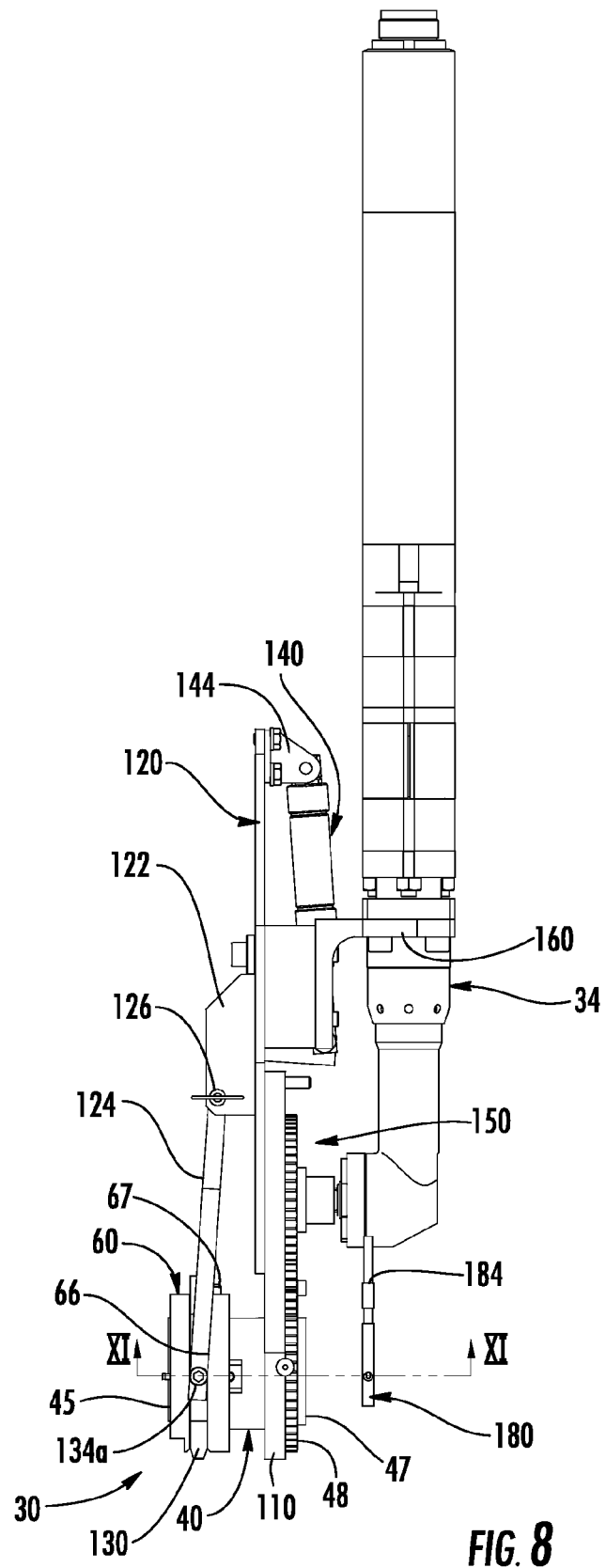
FIG. 8 is a top plan view of the vehicle toe set adjustment device including portions of the housing removed.
Figure 9:
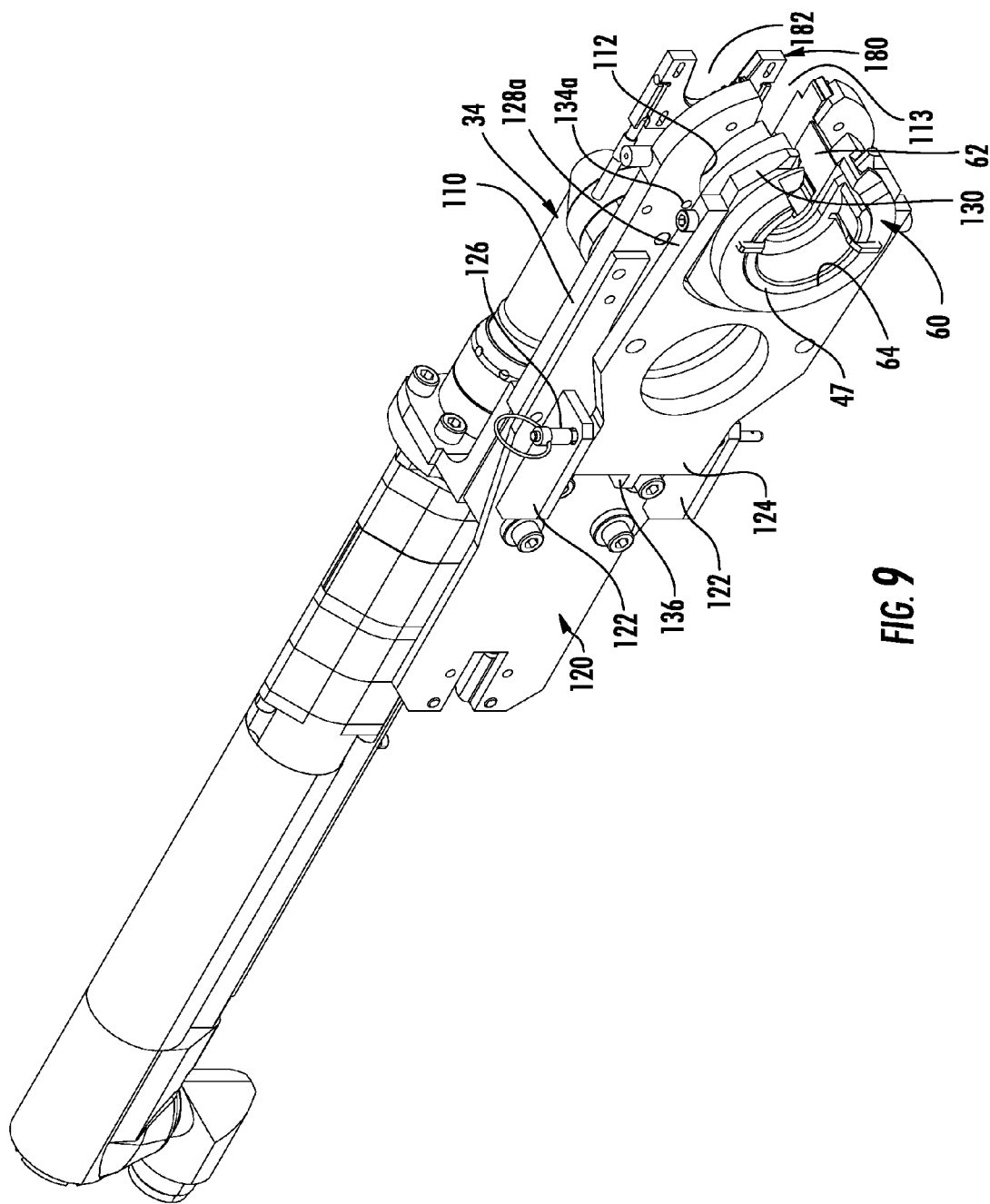
FIG. 9 is a front right perspective view of the vehicle toe set adjustment device of FIG. 8.
Figure 11:
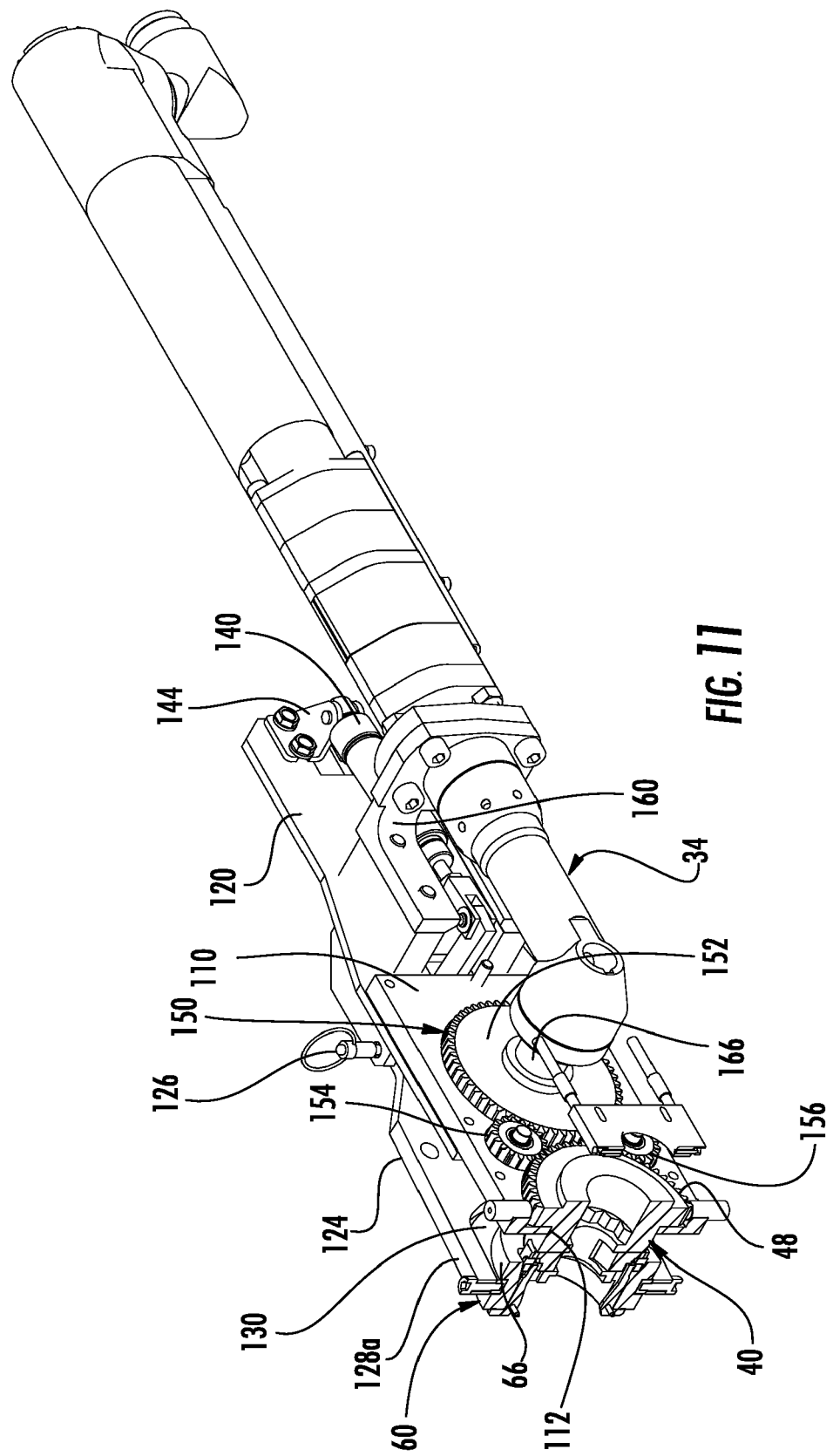
FIG. 11 is a perspective view of the vehicle toe set adjustment device with portions removed or shown in section and taken along plane XI-XI of FIG. 8.
Figure 13:
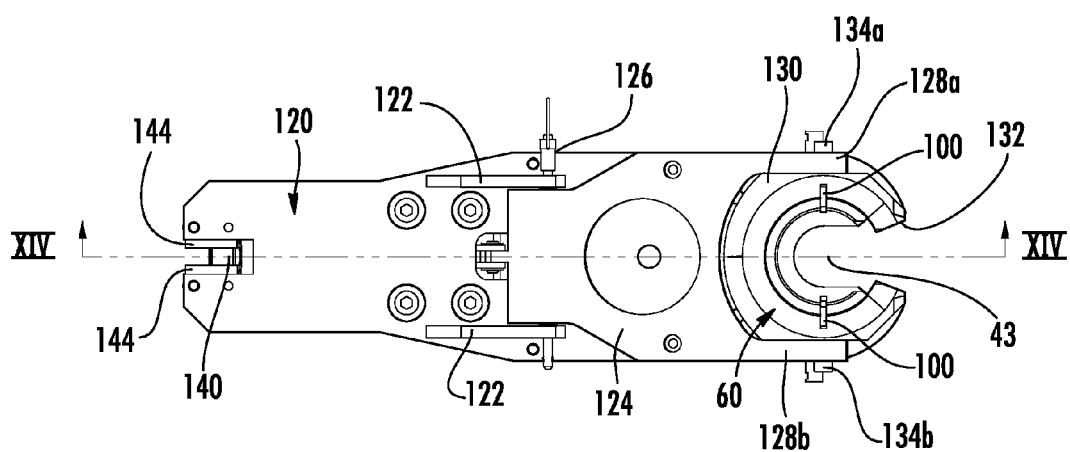
FIG. 13 is a side elevation of the adjustment head of the vehicle toe set adjustment device of FIGS. 8 and 9.
Figure 14:
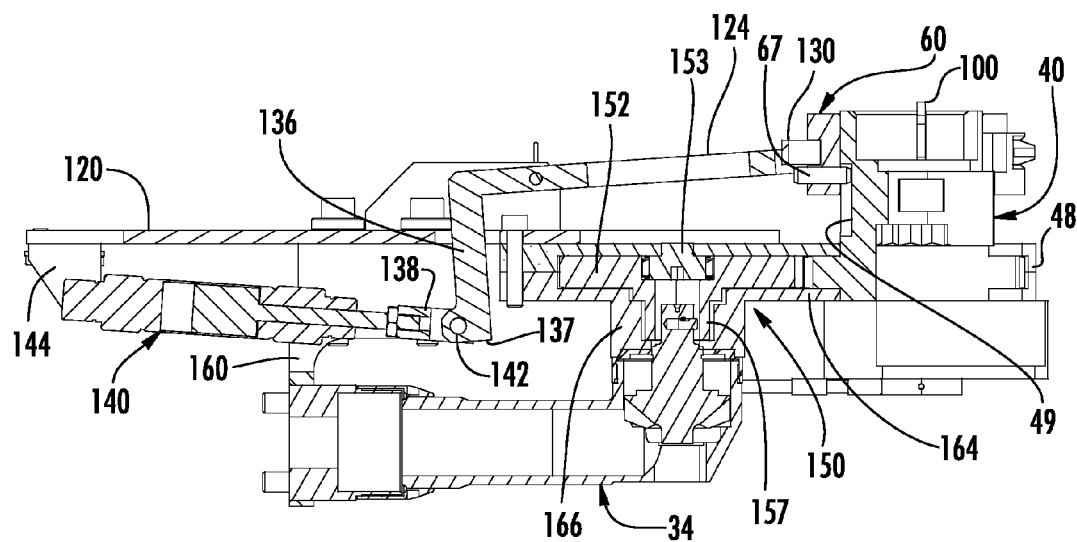
FIG. 14 is a sectional plan view of the vehicle toe set adjustment head taken along plane XIV-XIV of FIG. 13.
Figure 15:
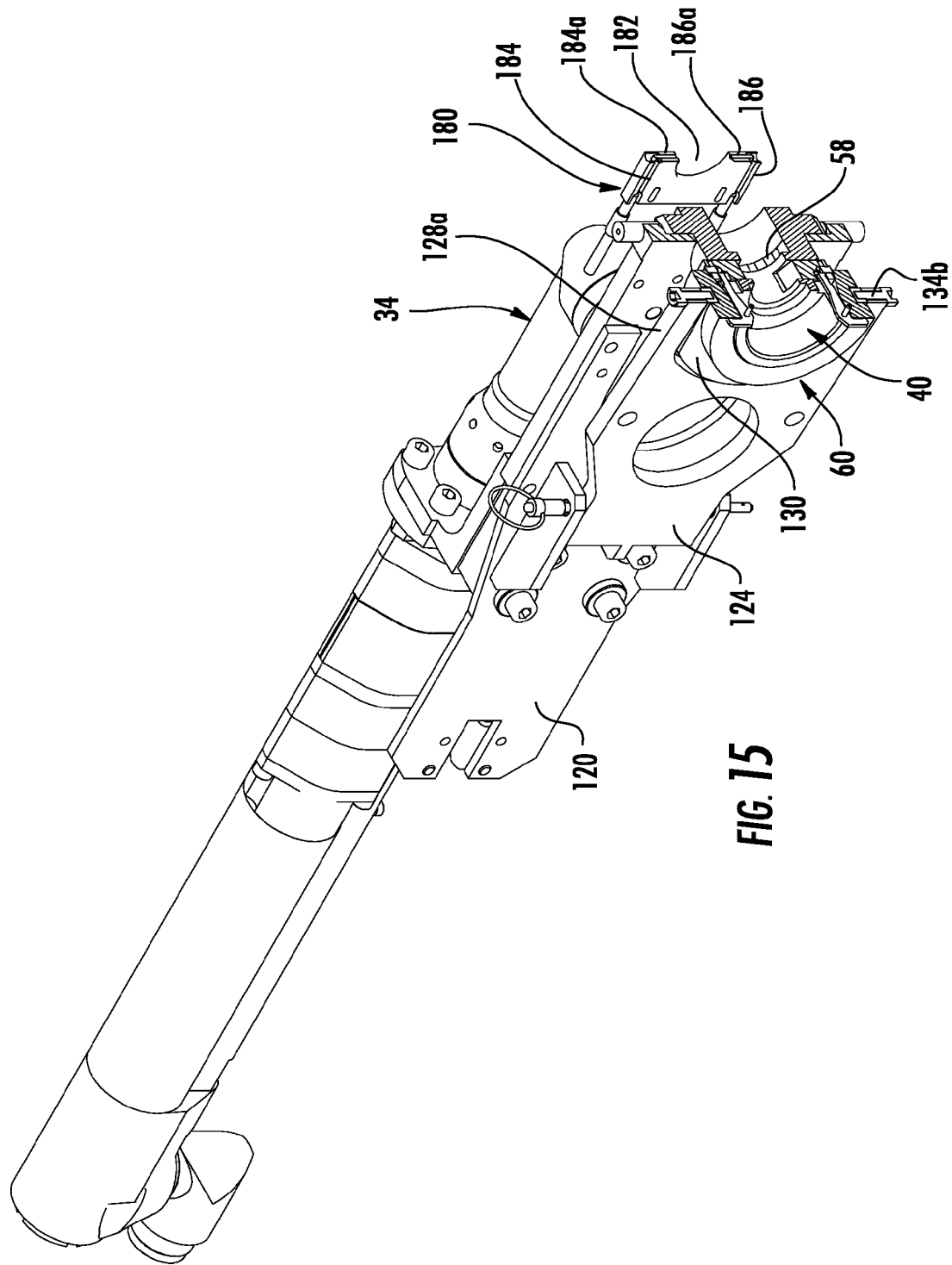
FIG. 15 is a perspective view of the vehicle toe set adjustment head similar to FIG. 9 but with portions removed or shown in section.
Figure 16A:
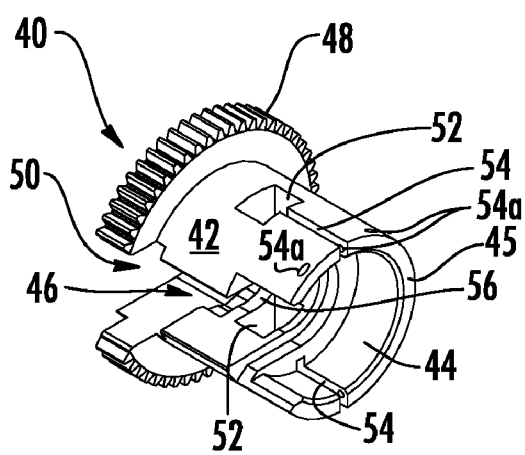
FIGS. 16A-16E are perspective and elevation views of the tubular socket of the adjustment head of the vehicle toe set device.
Figure 16B:
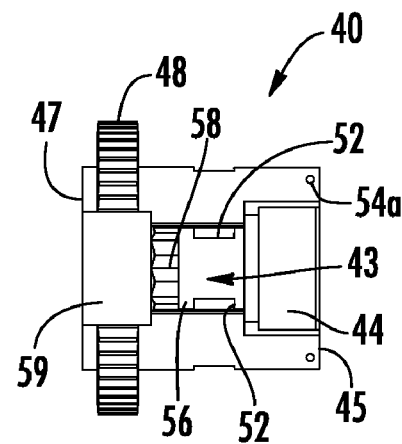
Figure 16C:
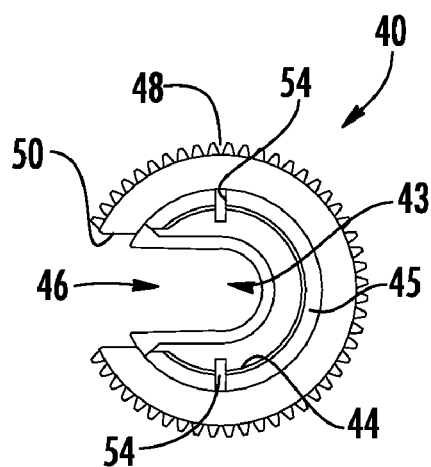
Figure 16D:
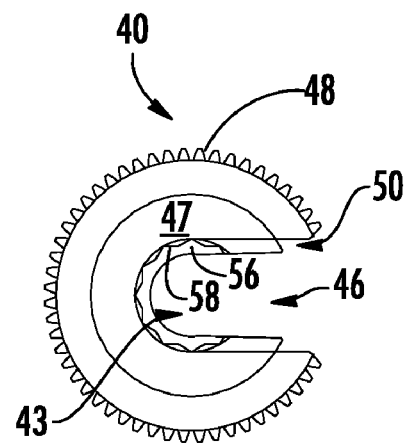
Figure 16E:
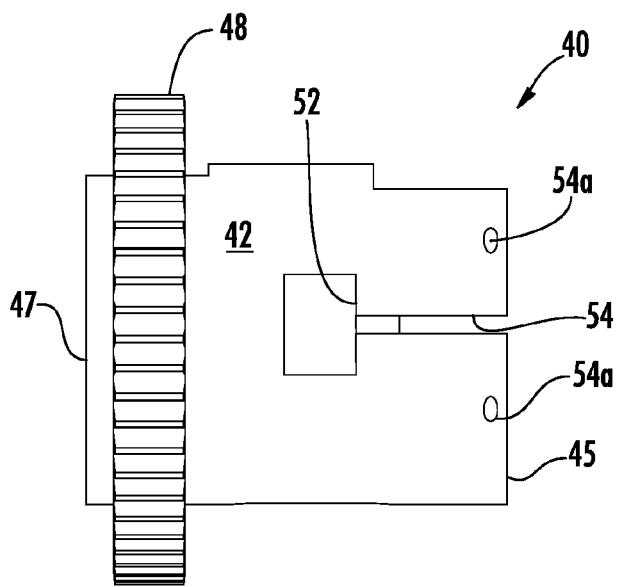
Figure 18A:
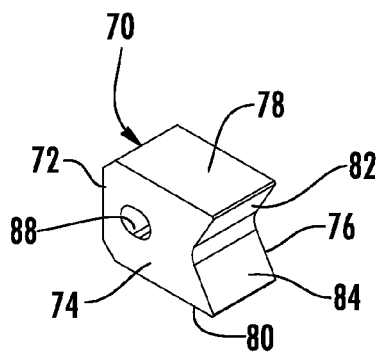
FIGS. 18A-18D are perspective, elevation and plan views of one of the collet keys removed from the tubular socket of the present invention.

At the rearward end of pivot plate 124 is an actuating arm 136 best seen in FIGS. 13-15. Arm 136 extends generally at a right angle to the plane of actuator plate 124 and includes a terminal end 137 pivotally pinned to bracket 138 on the end of pneumatic actuating cylinder 140 by pin 142. The rearward end of cylinder 140 is pivotally mounted on plates 144 on the side of mounting plate 120 adjacent drive unit 34 (FIG. 11). Accordingly, when pneumatic cylinder 140 is actuated to extend its movable piston and bracket 138, arm 136 is urged toward tube 40 on adjustment head 30 thereby pivoting actuating plate 124 outwardly away from plates 110, 120 and toward end 45 of tube 40 as shown in FIGS. 8 and 14. Such outward movement of plate 124 moves shift bearing 130 and actuator ring 60 away from collet keys 70 by means of the pivotal connection provided by pins 134a, 134b between forked arms 128a, 128b and shift bearing 130. Such lateral movement engages lifter arms 104 to pivot the lifters and move collet keys 70 radially outwardly away from tie rod T. Likewise, retraction of the piston of pneumatic cylinder 140 as shown in FIG. 14 pivots actuator plate 124 toward mounting plates 110, 120 by means of pivot pin 126 such that shift bearing 130 and actuator ring 60 are moved axially toward the collet key such that cam surface 68 engages wear pins 90 to urge collet keys 70 radially inwardly toward axial opening 43 in the tube. Such inward extension of the collet keys engages those keys with the desired surfaces or flats H on the tie rod T to enable driving rotation of the tie rod for adjustment purposes.

Alternately, it will be understood that actuator ring 60 could be a rotary cam (not shown) including internal spiral grooves for engaging collet keys 70 and wear pins 90 instead of an axially shiftable ring as described above. In such case, the rotary ring would be rotated in one direction by a suitable drive assembly to advance the collet keys toward tie rod T when desired and rotated in the opposite direction by such a drive assembly to withdraw the collet keys away from the tie rod.

When rotation of the tie rod T is desired, tube 40 is rotated by means of ring gear 48 via a drive gear assembly 150 and drive unit 34 best shown in FIGS. 8, 10, 11 and 14. Drive gear assembly 150 includes a main circular drive gear 152 rotatably mounted on suitable bearings on spindle 153 (FIG. 14) secured to mounting plate 120. Drive gear 152 in turn engages spaced idler gears 154, 156 which, in turn, engage ring gear 48 on tube 40. Driving engagement is provided through idler gears 154, 156 to enable proper driving engagement with ring gear 48 at all times even though at various times during rotation of tube 40, opening 50 in ring gear 48 will be radially aligned with one of the idler gears 154, 156.

As shown in FIGS. 8, 11 and 14, drive gear assembly 150 is given by right angle drive unit 34 secured to mounting plate 120 by bracket 160. Drive unit 34 includes a drive spindle 162 (FIG. 14) driven by a hydraulic or electric motor extending longitudinally along tie rod engaging assembly 20 rearwardly away from the adjustment head 30. Spindle 162 engages a socket in extending shaft 157 of drive gear 152 (FIG. 14), the drive end of unit 34 being mounted on the projecting spindle 166 of mounting plate 164 which is bolted to mounting plate 120 to enclose and retain drive gear 152 on spindle 153 (FIG. 14). Accordingly, when operated, spindle 162 rotates drive gear 152 which, in turn, rotates idler gears 154, 156 to continuously rotate ring gear 48 and thus the entire adjustment head assembly within aperture 112 of mounting plate 110.

Figure 10:
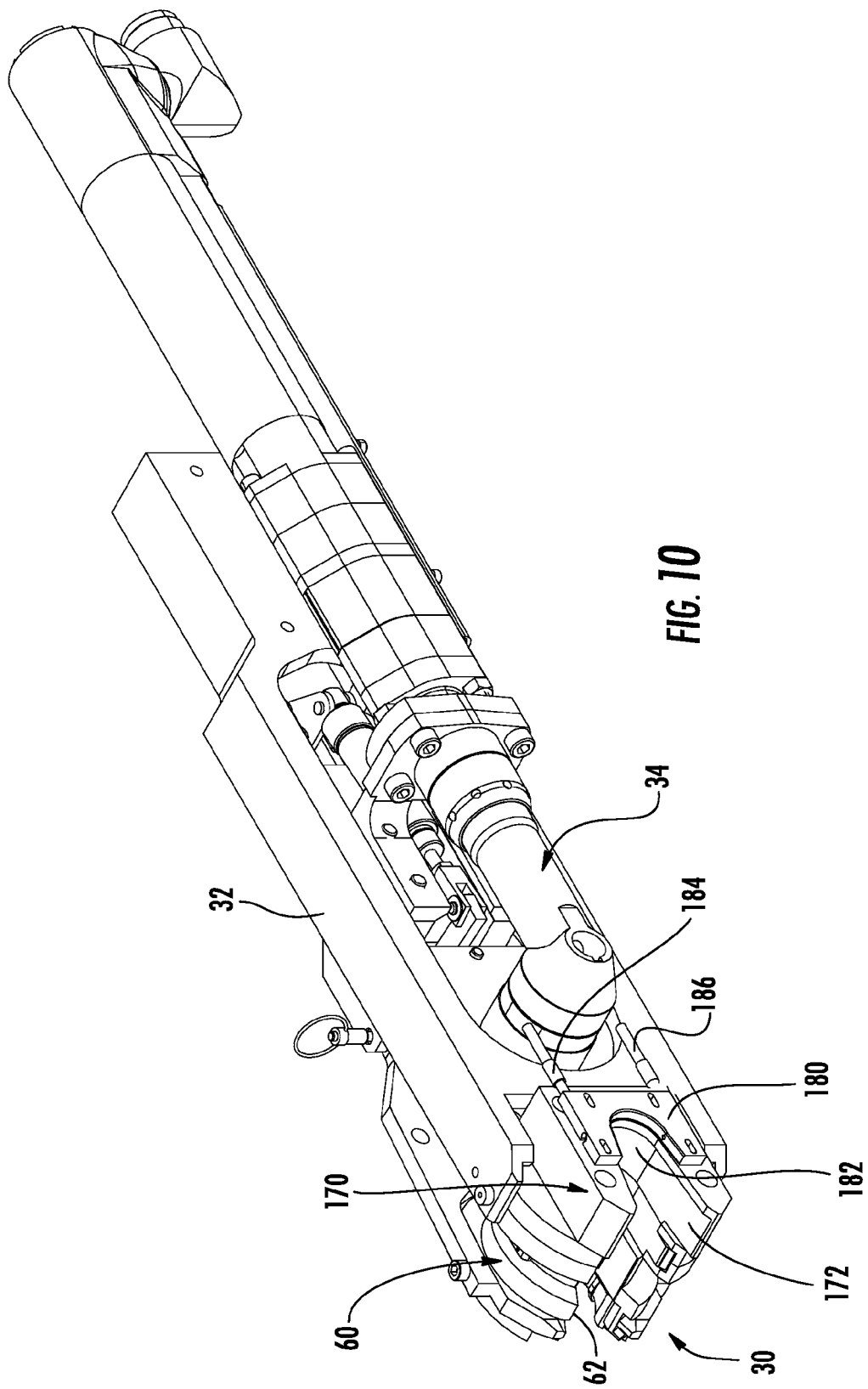
FIG. 10 is a front left perspective view of the vehicle toe set adjustment device of FIGS. 8 and 9.

As is best seen in FIG. 10, adjustment head 30 also includes an alignment shoe or outrigger 170 secured to plate 110 immediately adjacent end 47 of tube 40. Alignment shoe 170 includes a radial opening 172 leading to an axial opening aligned with the axial opening 43 of tube 40 when mounted. When openings 46 and 50 of tube 40 and ring gear 48 are aligned with opening 172 in alignment shoe 170, adjustment head 30 can be received over a tie rod assembly such that the tie rod T is received and extends axially through the aligned openings as shown in FIGS. 3-8. Preferably, alignment shoe 170 is formed from brass or another material and includes a tapered throat in opening 172 to help guide the alignment head onto tie rod T. Shoe 170 may be formed from metal or plastic and preferably is of a hardness that will avoid causing scratching or cosmetic damage to the surface of the tie rod.

Immediately adjacent alignment shoe 170 is a generally C-shaped sensor mount 180 also including a radial opening 182 leading to an axial opening adapted for alignment with the opening through alignment shoe 170 and axial opening 43 of tube 40. Sensor mount 180 includes fiber optic cables 184, 186 including ends 184a, 186a extending at a right angle to those cables and axially aligned with one another across opening 182 (FIG. 15). Cable ends 184a, 186a project a light beam across opening 182 which is interrupted and broken when tie rod T enters the opening when inserted in the adjustment head 30. A sensor is connected to cables 184, 186 and mounted at a remote location on the tie rod engaging assembly to sense the interruption in the light beam thereby confirming entry of the tie rod fully into the opening and proper engagement of adjustment head 30 with the tie rod.

Alternately, a proximity switch can be mounted on the assembly, such as on alignment shoe 170 to verify the engagement of the adjustment head with the tie rod, In addition, in order to properly align the openings 46, 50 with openings 113, 172, and 182 on the adjustment head to allow proper engagement with a tie rod, a proximity switch maybe mounted on a shaft extension from drive unit 134 that confirms rotational alignment of openings 46, 50 and 62 with openings 113, 172 and 182 to allow proper receipt of a tie rod therethrough.

METHOD Of OPERATION

The method and operation of the toe set/tie rod adjustment device 20 will now be understood. When a vehicle for which toe set adjustment is desired is positioned on a test stand or support above or adjacent robot 24, a wheel alignment device, camera or preset coordinates for the specific vehicle in control 26 associated with the test stand determines the position of the tie rod assemblies on the left and right side of the vehicle. This may include the position of tie rod assemblies either on the front axle or rear axle depending on which wheels are steerable. When the position of the tie rod assemblies is properly incorporated in control 26, robot 24 is activated to bring the throat of alignment shoe 170 into radial alignment with the neutral zone N of tie rod T, i.e., the tie rod area intermediate jam nut J and the hex flats H formed on the tie rod itself as shown in FIGS. 19 and 20. The robot 24 continues movement of the tie rod adjustment device 20 toward tie rod T with any misalignment being absorbed by multi-axis compliance assembly 28 as described above as the tie rod enters the throat of alignment shoe 170. As tie rod T enters the throats of openings 46, 50, 62, 113, 172 and 182, the beam of light between fiber optic cables 184a and 186a is broken and sensed confirming entry of the tie rod into the axial opening of the adjustment head. Prior to engagement with the tie rod, appropriate proximity switches on the drive unit assure that these openings are aligned for receipt of the tie rod.

Once the adjustment head 30 is engaged with the neutral zone N of the tie rod T as shown in FIGS. 19 and 20, control 26 causes robot 24 to laterally move or shift the adjustment head axially along rod T toward jam nut J while slightly oscillating tube 40 by means of drive gear assembly 150 and drive unit 34 to find and fully engage socket surfaces 58 with jam nut J. Confirmation that hex flats 58 are fully engaged with the jam nut J is made by sensing the location of head 30 via robot 24 and/or measuring the resistance to rotation by measuring the torque necessary to rotate tube 40 with sensors in drive unit 34, such as by current sensors or torque sensors. Thereafter, control 26 activates drive unit 34 thereby rotating tube 40 and actuator ring 60 by means of drive gear assembly 150 and gear ring 48 to loosen jam nut J from its fastened position. Once jam nut J is backed off to a loosened position, usually two to four turns, the movement of tube 40 laterally with the turning of the jam nut aligns collet keys 70 at least partially with hex flats H on the tie rod. Alternately, if the particular tie rod assembly being adjusted has hex flats that are not aligned with the collet keys when the jam nut has been loosened in this manner, control 26 can cause robot 24 to laterally translate or axially shift the entire adjustment head along rod T toward the hex flats H until there is alignment between collet keys 70 and hex flats H. When the tube 40 is in place with collet keys 70 in alignment with hex flats H, and jam nut j is sufficiently loosened, pneumatic cylinder 140 is activated to pivot plate 124 and shift bearing 130 thereby laterally moving actuator ring 60 toward gear ring 48 and mounting plate 110. Lateral movement of actuator ring 60 causes camming surface 68 to engage the wear pins 90 on collet keys 70 urging both collet keys simultaneously radially inwardly to engage their angled surfaces 82, 84 with hex flats H in diametrically opposed positions on the tie rod. Use of two opposed collet keys each having two angled engaging surfaces 82, 84 avoids the need for three or more collets for engagement with the hex flats because opposed surfaces 82, 84 firmly engage four of the hex flats to allow driving rotation of the tie rod key for adjustment. As the collet keys are advanced inwardly by the camming action of surface 68 with wear pins 90, drive gear assembly 150 is again oscillated via drive unit 34 and control 26 such that the collet key engaging surfaces 82, 84 firmly engage in flat to flat engagement for proper driving rotation.

Once the collet key surfaces 82, 84 are fully engaged with the hex flats H, control 26 activates drive gear assembly 150 via drive unit 34 to rotate the tie rod T either clockwise or counterclockwise in order to properly adjust the toe set on that particular wheel of the vehicle. Rotation occurs in an amount sufficient to adjust the toe set in accord with preset calculations after which the toe set is again measured by the wheel alignment apparatus associated with the test stand. Should further adjustment be needed, control 26 rotates the drive gear assembly via drive unit 34 and gear ring 48 in the appropriate direction until proper toe set is achieved. Following such adjustment, control 26 activates pneumatic cylinder 140 to pivot plate 124 in the opposite direction thereby shifting actuator ring 60 in the opposite axial direction to engage surfaces 105 on lifter arms 104 to retract collet keys 70 radially outwardly from their engaged position to their disengaged position. Thereafter, robot 24 laterally moves tube 40 toward jam nut J while drive gear assembly 150 oscillates tube 40 and thus hex surfaces 58 to find and fully engage the jam nut. It will be understood that depending on the length of neutral zone N on the tie rod, i.e., if neutral zone N is very short, hex surfaces 58 may remain engaged with the jam nut J throughout the entire tie rod adjustment sequence, and separate lateral shifting of tube 40 via the robot may not be necessary since tube 40 will move laterally with the jam nut as it rotates on the threads on end E of the tie rod. Subsequently, rotation of tube 40 is commenced via control 26 once the jam nut is fully engaged by surfaces 58. Drive unit 34 may include a rotational servo-motor with a digital encoder and appropriate strain gauges on or in the unit to determine the torque applied to the jam nut. Once the jam nut is tightened to the required torque, the adjustment head is laterally moved by the robot 24 to neutral zone N of the tie rod while tube 40 and actuator ring 60 are rotated such that their openings 46, 50 and 62 are aligned with openings 113, 172 and 182 of mounting plate 110, alignment shoe 170 and sensor mount 180. Adjustment head 30 is then retracted away from the tie rod assembly via robot 24 to await use with the next vehicle to be tested.

It will also be understood that adjustment head 30 may be modified to allow collet keys 70 to be extended partially toward the tie rod in varying amounts to allow engagement with tie rods of different diameters or sizes having hex surfaces or other engaging surfaces of different base sizes. Likewise, hex surfaces 58 of different sizes may be included in concentric, stepped fashion with tube 40 to allow engagement with differing sizes of jam nuts J. Use of such modifications to adjustment head 30 permits use of the same modified head 30 on one assembly line where different vehicles with different sized tie rods may be encountered and adjusted without changing the adjustment head.

While several forms of the invention have been shown and described, other forms will now be apparent to those skilled in the art. Therefore, it will be understood that the embodiments shown in the drawings and described above merely for illustrative purposes, and are not intended to limit the scope of the invention which is defined by the claims which follow.

The embodiments of the invention in which I claim exclusive property or privilege are defined as follows:

1. A vehicle toe set adjustment device for adjusting a vehicle tie rod, said adjustment device comprising:
    an adjustment head having interior and exterior surfaces, an opening from said exterior surface to said interior surface and through which a tie rod is adapted to be received; a surface for engaging a tie rod fastener, a plurality of collet keys movably mounted on said adjustment head, and a drive member engaging surface;
    an actuator that engages said adjustment head and moves said collet keys to engage the tie rod when the tie rod is received in the adjustment head, said actuator being movably received on said adjustment head for engagement with said collet keys;
    whereby said adjustment head is engagable with the rod fastener and the tie rod for rotation and adjustment thereof; and
    including an actuator drive member for moving said actuator to extend and withdraw said collet keys to engage and grip the tie rod when rotation of said tie rod is desired, wherein said adjustment head is a cylinder having a central axial opening therethrough; said actuator including a ring telescoped over the exterior surface of said cylinder; said actuator drive member includes a pivot member engaging said actuator ring to axially shift said actuator ring to cam said collet keys toward said central axial opening.

2. The adjustment device of claim 1 wherein said actuator ring includes a circumferential groove, said actuator drive member including a fork engaging said groove.

3. A vehicle toe set adjustment device for adjusting a vehicle tie rod, said adjustment device comprising:
    an adjustment head having interior and exterior surfaces, an opening from said exterior surface to said interior surface and through which a tie rod is adapted to be received; a surface for engaging a tie rod fastener, a plurality of collet keys movably mounted on said adjustment head, and a drive member engaging surface;
    an actuator that engages said adjustment head and moves said collet keys to engage the tie rod when the tie rod is received in the adjustment head, said actuator being movably received on said adjustment head for engagement with said collet keys;
    whereby said adjustment head is engagable with the rod fastener and the tie rod for rotation and adjustment thereof; and
    including an actuator drive member for moving said actuator to extend and withdraw said collet keys to engage and grip the tie rod when rotation of said tie rod is desired, and including an adjustment head drive member for engaging said drive member engaging surface to rotate said adjustment head when rotation of the tie rod fastener or tie rod is desired.

4. The adjustment device of claim 3 wherein said drive member engaging surface is a gear ring; said adjustment head drive member including a drive gear engaging said gear ring.

5. The adjustment device of claim 3 wherein said surface for engaging the rod fastener includes a hex socket adapted to engage the exterior surface of a jam nut.

6. The adjustment device of claim 5 wherein said collet keys are laterally offset from said hex socket on said adjustment head.

7. The adjustment device of claim 3, further including a positioning device, said adjustment head being mounted to said positioning device with said positioning device being operable to engage said adjustment head with a tie rod of a vehicle.

8. The adjustment device of claim 7, wherein said positioning device is a multi-axis robot.

9. A vehicle toe set adjustment device for adjusting a vehicle tie rod having a shaft end including integral flats and a threaded end including a jamb nut, said adjustment device comprising:
    a tie rod engaging assembly including an adjustment head having a rotatable socket, said socket including an axially extending opening through which a tie rod is adapted to be received, said socket further including an exterior gear, a non-geared end portion having an exterior surface extending laterally adjacent said gear, and an interior socket surface for engaging a jamb nut of a tie rod;
    a collet key mounted to said laterally extending end portion, said collet key being radially extendable with respect to said socket relative to the longitudinal rotational axis of said socket; and
    an actuator mounted to said laterally extending end portion, said actuator being moveable with respect to said socket for engagement with said collet key to radially extend said collet key into engagement with an integral flat on a tie rod received into said opening of said tubular socket, wherein said actuator is moveable lon itudinall relative to the rotational axis of said socket to radially extend said collet key.

10. The adjustment device of claim 9, wherein said rotatable socket includes a plurality of collet keys, and wherein said actuator is moveable for engagement with said collet keys for radial extension of said collet keys.

11. The adjustment device of claim 9, further including a positioning device, said tie rod engaging assembly being mounted to said positioning device, said positioning device being operable to engage said adjustment head with a tie rod of a vehicle.

12. The adjustment device of claim 11, wherein said positioning device is a multi-axis robot having a positioning arm on which said tie rod engaging assembly is mounted.

13. The adjustment device of claim 9, wherein said socket includes a radially extending aperture in said non-geared end portion, said aperture receiving said collet key whereby said collet key is radially extendable within said aperture relative to the longitudinal rotational axis of said socket.

14. A vehicle toe set adjustment device for adjusting a vehicle tie rod having a shaft end including integral flats and a threaded end including a jamb nut, said adjustment device comprising:
    a tie rod engaging assembly including an adjustment head having a rotatable socket, said socket including an axially extending opening through which a tie rod is adapted to be received, said socket further including an exterior gear, a non-geared end portion having an exterior surface extending laterally adjacent said gear, and an interior socket surface for engaging a jamb nut of a tie rod;
    a collet key mounted to said laterally extending end portion, said collet key being radially extendable with respect to said socket relative to the longitudinal rotational axis of said socket; and
    an actuator mounted to said laterally extending end portion, said actuator being moveable with respect to said socket for engagement with said collet key to radially extend said collet key into engagement with an integral flat on a tie rod received into said opening of said tubular socket, wherein said actuator is connected with said socket for rotation with said socket and is moveable longitudinally relative to the rotational axis of said socket for engagement with said collet key.

15. The adjustment device of claim 14, wherein said actuator comprises a c-shaped actuator ring having an actuator opening, and wherein said exterior surface of said socket comprises a generally c-shaped cylindrical exterior surface, and wherein said actuator ring is mounted to said exterior surface with said actuator opening being aligned with said opening of said socket, and wherein said actuator ring slides longitudinally along said exterior surface for engagement with said collet key.

* * * * *

UNITED STATES PATENT AND TRADEMARK OFFICE
CERTIFICATE OF CORRECTION

| | |
|---|---|
| PATENT NO. | : 8,082,822 B2 |
| APPLICATION NO. | : 12/251778 |
| DATED | : December 27, 2011 |
| INVENTOR(S) | : Mark S. Hoenke |

Page 1 of 1

It is certified that error appears in the above-identified patent and that said Letters Patent is hereby corrected as shown below:

Title Page
"(54) Inventor: Mark S Hoenke, Grand Rapids, MI (US)"
should be --(54) Inventor: Mark S. Hoenke, Grand Rapids, MI (US)--

Column 2
Line 8, "a-predetermined" should be --a predetermined--

Column 5
Line 34, "bead" should be --head--

Column 7
Line 39, "Ann" should be --Arm--
Line 41, "13 8" should be --138--

Column 8
Line 66, "," should be --.-- after rod

Column 9
Line 7, "Of" should be --OF--

Column 12
Line 27, Claim 9, "lon itudinall" should be --longitudinally--

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,082,822 B2  Page 1 of 1
APPLICATION NO. : 12/251778
DATED : December 27, 2011
INVENTOR(S) : Mark S. Hoenke It is certified that error appears in the above-identified patent and that said Letters Patent is hereby corrected as shown below:

Title Page
"(75) Inventor: Mark S Hoenke, Grand Rapids, MI (US)"
should be --(75) Inventor: Mark S. Hoenke, Grand Rapids, MI (US)--

In the Specification:
Column 2
Line 8, "a-predetermined" should be --a predetermined--

Column 5
Line 34, "bead" should be --head--

Column 7
Line 39, "Ann" should be --Arm--
Line 41, "13 8" should be --138--

Column 8
Line 66, "," should be --.-- after rod

Column 9
Line 7, "Of" should be --OF--

In the Claims:
Column 12
Line 27, Claim 9, "lon itudinall" should be --longitudinally--

This certificate supersedes the Certificate of Correction issued March 19, 2013.

Signed and Sealed this
Ninth Day of April, 2013

Teresa Stanek Rea
*Acting Director of the United States Patent and Trademark Office*